(12) United States Patent  
Kadambe et al.

(10) Patent No.: US 7,899,761 B2  
(45) Date of Patent: Mar. 1, 2011

(54) SYSTEM AND METHOD FOR SIGNAL PREDICTION

(75) Inventors: Shubha Kadambe, Thousand Oaks, CA (US); Leandro G. Barajas, Rochester Hills, MI (US); Youngkwan Cho, Los Angeles, CA (US); Pulak Bandyopadhyay, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 11/113,962

(22) Filed: Apr. 25, 2005

(65) Prior Publication Data

US 2006/0241927 A1    Oct. 26, 2006

(51) Int. Cl.  
*G06F 15/18* (2006.01)

(52) U.S. Cl. .......................... 706/12; 706/14; 704/256; 714/E11.014

(58) Field of Classification Search ................ 704/256, 704/256.1, E11.197; 706/20, 12, 14; 714/E11.014  
See application file for complete search history.

(56) References Cited

U.S. PATENT DOCUMENTS

| | | | | |
|---|---|---|---|---|
| 5,309,379 A * | 5/1994 | Rawlings et al. | ................ | 703/8 |
| 5,465,321 A * | 11/1995 | Smyth | ................ | 706/20 |
| 5,467,449 A * | 11/1995 | Gauronski et al. | ................ | 714/57 |
| 5,566,092 A * | 10/1996 | Wang et al. | ................ | 702/185 |
| 5,581,694 A * | 12/1996 | Iverson et al. | ................ | 714/26 |
| 5,602,761 A * | 2/1997 | Spoerre et al. | ................ | 702/179 |
| 5,982,929 A * | 11/1999 | Ilan et al. | ................ | 382/200 |
| 6,012,147 A * | 1/2000 | Waedt et al. | ................ | 714/1 |
| 6,622,264 B1 * | 9/2003 | Bliley et al. | ................ | 714/26 |
| 6,671,634 B2 * | 12/2003 | Koutlev et al. | ................ | 702/60 |
| 6,725,398 B1 * | 4/2004 | Varma et al. | ................ | 714/25 |
| 7,260,505 B2 * | 8/2007 | Felke et al. | ................ | 702/187 |

(Continued)

FOREIGN PATENT DOCUMENTS

JP     2001091121 A  *  4/2001

OTHER PUBLICATIONS

R. Geist and K. Trivedi, "Reliability Estimation of Fault-Tolerant Systems: Tools and Techniques," Computer, vol. 23, No. 7, pp. 52-61, Jul. 1990.*

(Continued)

*Primary Examiner* — Richemond Dorvil  
*Assistant Examiner* — Greg A Borsetti  
(74) *Attorney, Agent, or Firm* — John A. Miller; Miller IP Group, PLC

(57) ABSTRACT

Disclosed herein are a system and method for trend prediction of signals in a time series using a Markov model. The method includes receiving a plurality of data series and input parameters, where the input parameters include a time step parameter, preprocessing the plurality of data series according to the input parameters, to form binned and classified data series, and processing the binned and classified data series. The processing includes initializing a Markov model for trend prediction, and training the Markov model for trend prediction of the binned and classified data series to form a trained Markov model. The method further includes deploying the trained Markov model for trend prediction, including outputting trend predictions. The method develops an architecture for the Markov model from the data series and the input parameters, and disposes the Markov model, having the architecture, for trend prediction.

20 Claims, 7 Drawing Sheets

U.S. PATENT DOCUMENTS

| | | | |
|---|---|---|---|
| 7,539,597 | B2* | 5/2009 | Wegerich et al. ............ 702/185 |
| 2002/0128799 | A1* | 9/2002 | Loecher ...................... 702/181 |
| 2003/0117279 | A1* | 6/2003 | Ueno et al. ................. 340/523 |
| 2004/0002776 | A1* | 1/2004 | Bickford ...................... 700/30 |
| 2004/0153866 | A1* | 8/2004 | Guimbellot et al. ............ 714/47 |
| 2005/0119887 | A1* | 6/2005 | Attias et al. ................. 704/256 |
| 2005/0251365 | A1* | 11/2005 | Matsushita et al. .......... 702/185 |
| 2006/0106743 | A1* | 5/2006 | Horvitz ........................ 706/21 |
| 2006/0178882 | A1* | 8/2006 | Braho et al. ................ 704/240 |

OTHER PUBLICATIONS

Reibman A L and Veeraraghavan M 1991 Reliability modeling: an overview for system designers IEEE Comput. 24 (April) 49-57.*

Aneziris, O. N., Papazoglou, I. A., & Lygerou, V. (2000). Dynamic safety analysis of process systems with an application to a cryogenic ammonia storage tank. Journal of Loss Prevention in the Process Industries, 13, 153.*

P. Weber and L. Jouffe, Reliability modeling with dynamic Bayesian networks, Fifth IFAC Symposium on Fault Detection, Supervision and Safety of Technical Processes. (Safeprocess'03), Washington DC, USA Jun. 9-11, 2003.*

F. Salfner. Predicting failures with hidden Markov models. In Proceedings of 5th European Dependable Computing Conference (EDCC-5), pp. 41-46, Budapest, Hungary, Apr. 20-22, 2005. Student forum volume.*

C.J. Kim, "Identification of symptom parameters for failure anticipation by timed-event trend analysis," IEEE Power Engineering Review, pp. 48-49, 2000.*

M. Pecht and Nash F., Predicting the reliability of electronic equipment, Proc IEEE 82 (1994) (7), pp. 992-1004.*

Ellis, Karen E., and Gibson, Gregory J., "Trend Analysis of Repair Times," Proceedings Annual Reliability and Maintainability Symposium, Jan. 1991, p. 85-92.*

Torrel, Wendy; Avelar, Victor; 2004; Mean Time Between Failure: Explanation and Standards; White Paper n. ° 78; American Power Conversion.*

V. Barbu, M. Boussemart and N. Limnios, Discrete time semi-Markov model for reliability and survival analysis, Comm. Statist. Theory Methods 33 (2004) (11), pp. 2833-2868.*

H. Akaike, "A new look at the statistical model identification," IEEE Transactions on Automatic Control, vol. AC-19, No. 6, Dec. 1974, 716-723.

J. Blair and A. Shirkhodale, "Diagnosis and prognosis of bearing using data mining and numerical visualization techniques," IEEE 2001, pp. 395-399.

X. Dongshan and S. Junyi, "A new Markov model for web access prediction," Computing in Science and Engineering, Nov./Dec. 2002, pp. 34-39.

K.E. Ellis and G. J. Gibson, "Trend analysis of repair times," Proc. Of Annual Reliability and Maintainability symposium, 1991, pp. 85-92.

C. J. Kim, "Identification of symptom parameters for failure anticipation by timed-event trend analysis," IEEE power engineering review, Sep. 2000, pp. 48-49.

J. R. Miller, "Results using trend analysis for predicting automotive maintenance needs," IEEE AutoTestCon 2002, pp. 809-817.

J. Rissanen, "Modeling by shortest data description," Automatica, vol. 14, pp. 465-471, 1978.

F. Zenan, F. Guanping and Z. Zhengsong, "The development of a fault diagnosis expert system for air-cooled turbogenerator," IEEE 1996, pp. 26-30.

S. Zhang, "Function estimation for multiple indices trend analysis using self-organizing mapping," IEEE symposium on Emerging technologies and factory automation, 1994, pp. 160-165.

Shubha Kadambe, Youngkwan Cho, and Leandro G. Barajas, "Finite-State Markov Model Based Knowledge Discovery", R&D—10110, Nov. 2005, General Motors Corporation Research & Development Center, Warren, Michigan.

* cited by examiner

SYSTEM AND METHOD FOR SIGNAL PREDICTION

FIELD OF THE INVENTION

This invention relates to analyzing time stamped data, and more particularly a system, method and apparatus utilizing a finite-state Markov model for predicting signal trends.

BACKGROUND OF THE INVENTION

In large scale manufacturing and assembly plants, such as those used in automobile manufacturing, hundreds of machines and their machine operators may work simultaneously. In a large production environment, the production line may include miles of conveyors. The plant itself may be millions of square feet. An increase in the precision of production timing and/or control may provide better resource allocation. Accordingly, process and controls that keep the line moving may increase production and reduce expenses.

In a single work shift, a machine, for example, at an automotive plant may process up to hundreds even thousands of products. The conveyor belt may move at several feet per second. The line moves fast and operations are complex. In large assembly or manufacturing plants, thousands of machines may be grouped into hundreds of stations. Many plants are substantially automated, where one manufacturing staff person may operate several machines. Additionally, a large plant may have many maintenance staff per shift.

For many different reasons, a machine may malfunction and generate a fault or an event code. There may be many thousands of event codes associated with a specific machine. An event or fault code is an industry term to indicate a change of state of a machine or its inputs or outputs. It also may provide a symptom or even the cause of a problem with a machine. Much like in a modern automobile, sensors are disposed in a machine to detect, for example, when out of the ordinary situations occur. In the case of an automobile, for example, if a door is left ajar, an event code will be generated to alert the occupant that a door is ajar. Event codes, when generated, may be electronically sent to a central location when a machine stops operating.

In a large plant, when one machine fails, its entire station or zone may stop operating, and thus the impact of the failure may be high. As a result, parts to be processed by the machine or station may accumulate, with machines feeding the halted machine becoming blocked because the upstream buffer has filled. Moreover, parts discharged for further processing by a downstream machine may drain from the downstream buffer, with machines drawing from it becoming starved. The impact of a downed machine or station can quickly spread to other machines and stations of the production line.

The maintenance staff is best utilized carrying out its primary task of maintaining the machines with preventative maintenance. Maintenance staff's primary task also includes repairing significant equipment failures. While routine maintenance may be planned, faults are not predicted. Thus, maintenance and repair resources may at times be overwhelmed in the number of event codes received from the line. In this way, maintenance and repair resource allocation is often times provided on in an ad hoc manner.

Various applications to process data are used in the manufacturing process. They include those to monitor event codes as they occur. More comprehensive analysis is possible however, it is extremely time consuming and often impractical due to the volume of the data that is required to be processed. The processing, however, may not include processing real-time data with historical data to get up to the minute predictions on future event code generation. In this way, current conditions may not be correlated with historical conditions to provide up-to-date predictions.

SUMMARY OF THE INVENTION

Disclosed herein is a system and method for trend prediction of signals in a time series using a Markov model. The method includes receiving a plurality of data series and input parameters, where the input parameters may include a time step parameter, preprocessing the plurality of data series according to the input parameters, to form binned and classified data series, and processing the binned and classified data series. The processing includes initializing a Markov model for trend prediction, and training the Markov model for trend prediction of the binned and classified data series to form a trained Markov model. The method further includes deploying the trained Markov model for trend prediction, including outputting trend predictions. The method develops an architecture for the Markov model from the data series and the input parameters, and disposes the Markov model, having the architecture, for trend prediction.

DETAILED DESCRIPTION OF THE INVENTION

Figure 1:
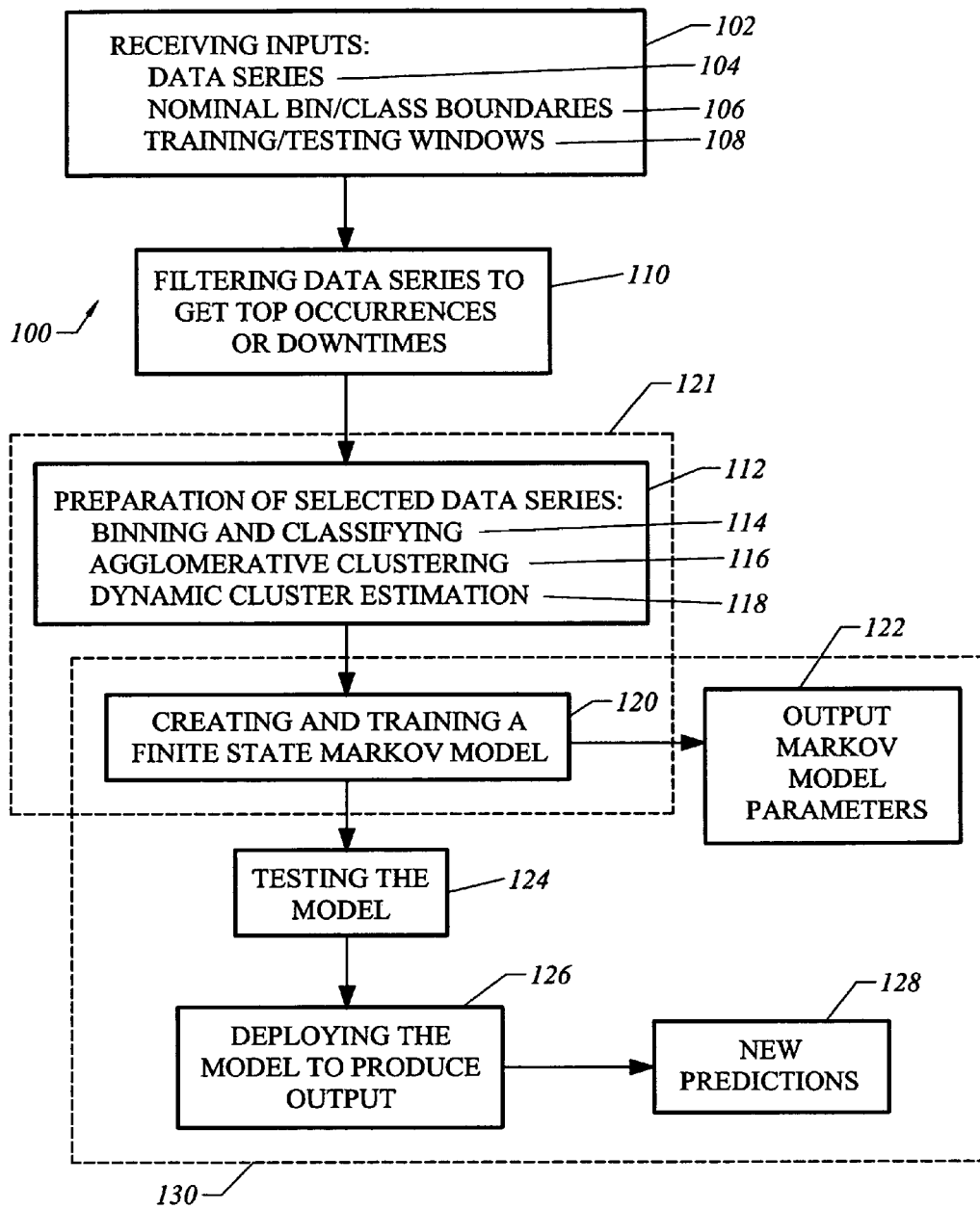
FIG. 1 is a flow chart showing steps of an embodiment.

Disclosed herein are a method and a system for predicting the trend of series of temporal events utilizing a finite state Markov model. A fully connected first order finite state Markov model is trained for an event series using discrete real time-series data. In general the model can be order Nth, where N can be determined by a cost function that uses as inputs, for example, the aggregated computational cost of higher order models and the improved accuracy of the model when a higher order is used. Assuming the trend of an event within a short time window can be modeled with some degree of approximation as a first order finite state Markov process, the model learns the overall trend of events in terms of probabilities from the past data. It is then tested by predicting the trend of occurrences, Mean Times to Repair (MTTRs) or downtimes of event codes for a chosen starting day and time period. A feature of the method is that an architecture for the Markov model is developed from the data series and the input parameters. The method disposes the Markov model with the architecture, for trend prediction. The method and system described herein may predict signal trends not only for event and fault codes but for any other signal. Signal characteristics like frequency, MTTR and downtime may be specific for fault data. The inputs for the model (that is, the training data discussed below) may be raw data, characteristics derived from the data, and domain expert knowledge. Other typical characteristics may include, for example, variance, absolute magnitude, and phase.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

In an embodiment tailored to fault occurrences in a manufacturing environment, disclosed are steps of (1) filtering input data (e.g., from an event code database), sorting faults by frequency of occurrence, MTTR and/or duration of downtime, and selecting the most frequently occurring faults and/or the faults resulting in the longest downtime durations (and occur often enough); (2) preparing the selected data for use in training a Markov model; (3) training the Markov model to predict frequency of occurrence, MTTR and/or downtime duration using a large data set (e.g., 6-12 months of data in the training period); (4) exercising the model by using it to predict frequency and/or duration for each day of a testing period (e.g., 5 months) immediately succeeding the training period; (5) evaluating the accuracy of the predictions by comparing predictions with actual data taken during the testing period; (6) deploying the trained Markov model for use in a manufacturing environment; and (7) updating the training of the Markov model as new event code data is continually acquired by the database. The steps listed above and described further herein may not be necessarily accomplished in the order or manner described above and herein. The order of steps may be changed, or two or more steps may occur concurrently, or a step may be omitted. Event code data may include any kind of binary or analog time stamped signals (evenly or unevenly sampled).

FIG. 1 is a flow chart showing steps of an embodiment of a method 100 for finite-state Markov model based prediction. A step of receiving inputs is shown at 102. The inputs may include one or a plurality of data series 104 made up of elements including event type—time value pairs. For example, an event type could be a particular event code occurring on a particular machine, and the time value could be a time value data structure including date, day of week, time zone information, hour, minute, and second. A subsequent data series element could mark the repair of the machine fault associated with the event code. Alternatively, the time value data structure could include the duration of the fault or downtime event or any other derived data or knowledge attributes, Examples are Mean Count Between Failures (MCBF), Mean Time Between Failures (MTBF), fault empirical and analytical histogram or distribution functions (including probability density function (pdf) and cumulative distribution function (cdf) parameters).

The inputs may also include 106 nominal widths or time step parameters for binning the time series data, and nominal class boundaries for classifying the data. In an embodiment discussed below, the bin width is chosen to be 24 hours, but other bin widths could be used. The bin width can be also found adaptively depending on the input data using either supervised or unsupervised learning methods. Class boundaries may be chosen to reflect appropriate features of the event type—time value pairs in the data series. For example, faults may be classified according to their durations. An example classification may have a downtime event with a duration of 0-2 minutes considered a non-event, a downtime event with a duration of 2-15 minutes considered a small event, one with a duration of 15-45 minutes considered a medium event, and a downtime event lasting longer than 45 minutes considered a large event. These input values for binning and classifying boundaries may be considered nominal. Later steps in method 100 may alter boundary values, as discussed below in connection with step 112.

The inputs may further include, at 108, a time interval, e.g. seven days, over which predictions may be sought, time values to designate the beginning and end of a training window, and time values to designate the beginning and end of a testing window. It may be that the end of the training window coincides with the beginning of the testing window, but this need not always be the case.

In a step 110, the input data series 104 are filtered, as listed above as a step (1). In the filtering step, for example, event code data may be selected according to the downtime duration associated with a fault. The event code data may instead, or in addition, be selected according to the number of occurrences, MTTR, MCBF, frequency of an event, or other signal characteristics. This may be determined by adding counts of faults. Fault frequency (faults per unit time) may thus be derived from binned data using the bin contents (i.e., counts) divided by the bin width (i.e., time interval or time step).

Event code data chosen for subsequent analysis by the method may therefore include those faults occurring most frequently (for example, the top 20 faults in terms of number of occurrences), may include those faults responsible for the most downtime (for example, the top 20 faults in terms of total downtime) and or may include those faults with the highest mean time to repair (MTTR). MTTR is the ratio of downtime duration for faults counted over some interval (e.g., the time step of 1 day) to the fault count over that interval, or duration/frequency. MTTR is a measure of how long, on average, a machine is unavailable for production due to a specific fault or event. In the filtering step, all the event type—time value pairs associated with each of the selected event codes constitute a selected data series, used for subsequent analysis.

The selected data series are prepared in a step 112, as listed I above as a step (2). The data are binned and classified according to the nominal bin and class boundaries 106 received as input in step 102. Binning the data (e.g., according to a time step parameter), may also be referred to as time partitioning the data, and the resulting binned data may also be referred to as time partitioned data. An agglomerative clustering process may be applied 116 to improve the statistics of the data, and a dynamic cluster estimation process may in addition be applied 118. The agglomerative clustering process will be discussed below in connection with FIGS. 2-7.

The dynamic cluster estimation process will be discussed below in connection with FIG. 8.

As discussed above, step 110 is a step (1) of filtering the input data. Step 112, just discussed, is a step (2) of preparing the selected data. Steps 110 and 112 together may be referred to as preprocessing the data series.

Continuing now with further discussion of the steps of FIG. 1, in a step 120 a finite state Markov model is created and trained for trend prediction of the selected data series prepared in step 112. The Markov model has an architecture tailored to the binning and classification of the data, where, for example, a state of the Markov model is associated with a class determined by classifying and/or clustering the data. The step of developing an architecture for a Markov model is shown in FIG. 1 at 121, and thus includes a part of the creating and training step 120, as well as including step 112. Once trained, parameters characterizing the Markov model may be output in a step 122. Training the Markov model was listed above as step (3). The Markov model will be discussed in detail below in connection with FIG. 9.

The trained Markov model is tested against input data in a step 124. Testing against input data may include exercising the model, and evaluating its predictions, as will be discussed further below. Exercising the Markov model was listed above as a step (4). Evaluating the predictions of the Markov model was listed above as a step (5). Exercising and evaluating the Markov model will be discussed in more detail below. Steps 120 and 124 may together be referred to as processing the data.

The trained Markov model is deployed for use with current and incoming data in a step 126, to produce output, including new trend predictions 128. The step of deploying the trained Markov model was listed above as a step (6). Although not shown in FIG. 1, incoming data—e.g., real time data or near real time data—may be used to update the model. For example, class boundaries may need alteration as changes in maintenance or production policies take effect. Required alterations may also follow re-processing class boundaries with re-application of the agglomerative clustering process. The step of updating the Markov model with newly acquired event code data was listed above as a step (7). Steps of training the Markov model 120, testing it 124, and deploying it 126 for trend prediction together may be referred to as disposing the Markov model, shown in FIG. 1 at 130. As shown in FIG. 1, disposing the Markov model may also include outputting Markov model parameters 122 and new predictions 128.

Turning now to discussion of agglomerative clustering 116, in general, agglomerative clustering is a method for iteratively arranging data into classes or clusters to meet some criteria or maximize some objective function. The agglomerative clustering task can be defined as sequential partitioning of N samples into C clusters in a supervised or unsupervised fashion. The number of clusters C may be less than the number of samples N.

Figure 2:
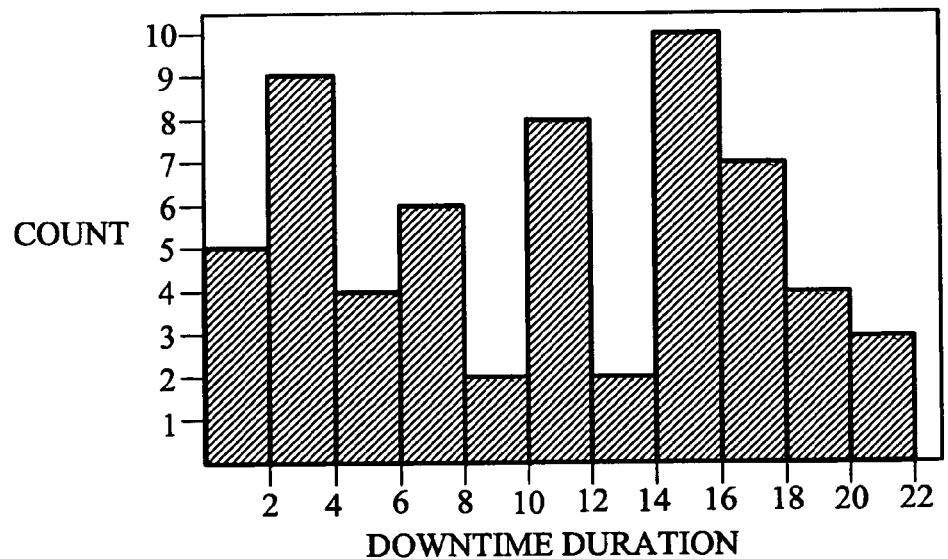
FIG. 2 shows an example of grouped downtime data.
Figure 3:
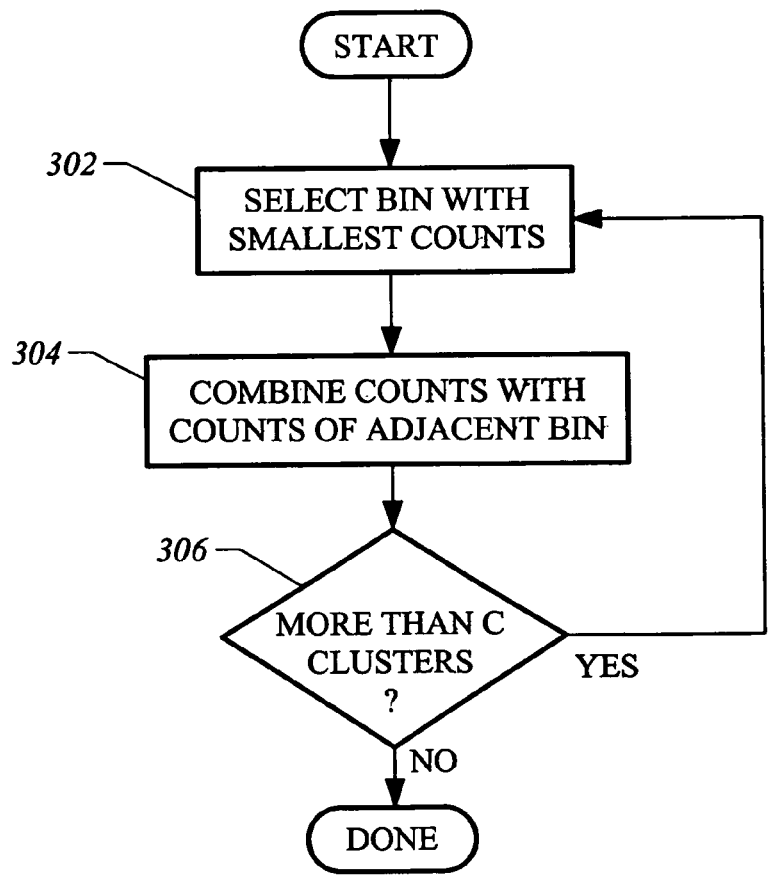
FIG. 3 is a flowchart of an agglomerative clustering process.

FIGS. 2-7 provide illustration of agglomerative clustering. First, as shown in FIG. 2, a histogram of the downtimes within the data set for a given fault is constructed by choosing fixed class boundaries with a respective size. (e.g., the class size of a 2 hour duration in FIG. 2). Agglomerative clustering is then applied to the resulting histogram. This process is shown in the flowchart of FIG. 3. FIGS. 4, 5, 6, and 7 illustrate aspects of clustering, as discussed in connection with processing data for training and testing a Markov model.

The clustering process is initiated by starting with the class with the fewest number of samples 302. This class is merged into a neighboring class 304 based on a similarity measure which, in this example, is a function of count and downtime.

One such similarity measure may be a Euclidean distance over data features. For example, two classes may be considered similar if the difference between the counts associated with their data is small, or if the difference between the downtime durations associated with their data is small, or if the difference between the MTTR values associated with their data is small. Nonlinear similarity measures (e.g., nonlinear combinations of the above three similarity measures) may also be defined. Other similarity measures appropriate for agglomerative clustering as used herein may be based on distance or other measures besides Euclidean, such as: City block (Manhattan), Chebyshev, Minkowski, Canberra, Bray Curtis (Sorensen), Angular separation, and Correlation coefficient.

Figure 4:
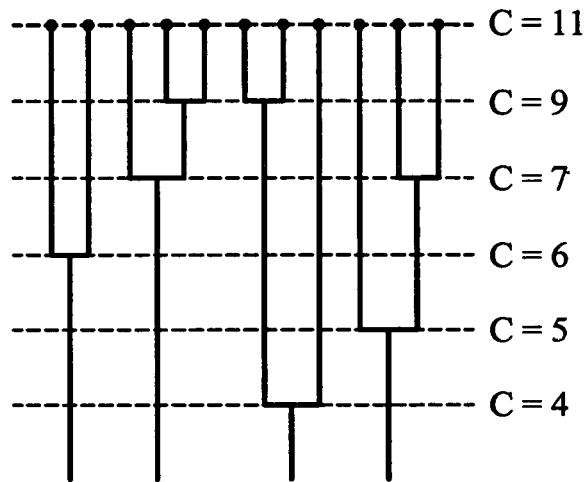
FIG. 4 shows the progression of an agglomerative clustering process with the data of FIG. 2.
Figure 5:
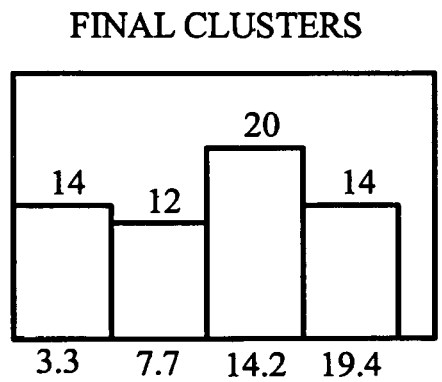
FIG. 5 shows the final clusters and their cluster centers for the data of FIG. 2.

This process is then continued 306 until the desired number of classes is obtained. The progression of the clustering process is shown in FIG. 4. For the example shown in FIG. 2, the final clusters and their cluster centers are shown, for the case where the number of clusters, that is, the number of classes, is selected to be 4, in FIG. 5.

Figure 6:
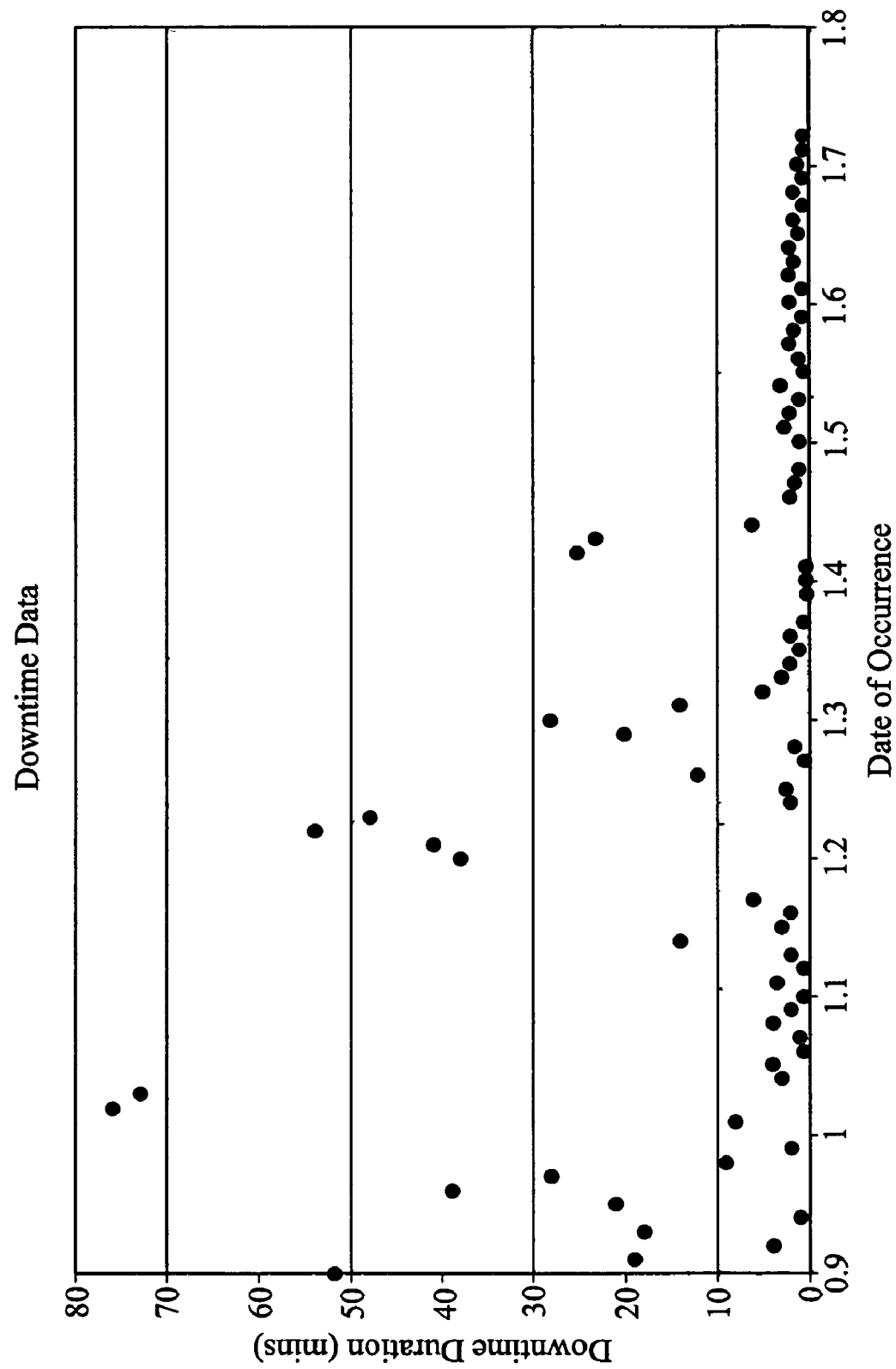
FIG. 6 shows an example of time series data, plotted as time of machine fault on the horizontal axis vs. duration of fault on the vertical axis.
Figure 7:
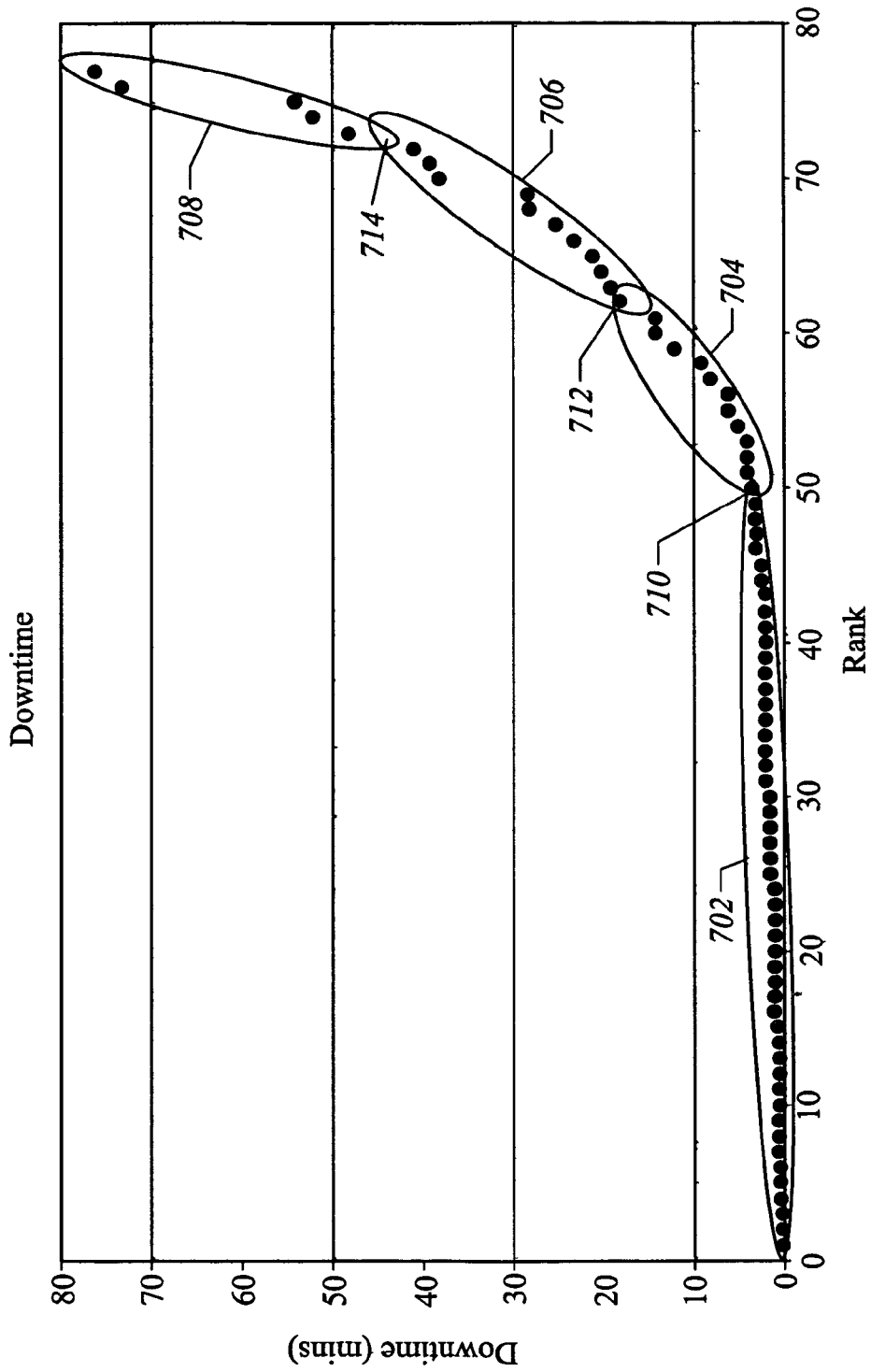
FIG. 7 shows the data of FIG. 6 plotted in order of increasing fault duration.

In another example of an agglomerative clustering process, example event code data is shown in FIG. 6. The data is plotted as time of fault occurrence on the horizontal axis vs. duration of downtime due to the fault on the vertical axis. In FIG. 7, the data is re-plotted in order of increasing downtime duration. For purposes of agglomerative clustering, each point plotted in FIG. 7 may represent a class. An agglomerative clustering procedure may then group neighboring classes into clusters until the desired number of clusters (in this case, four) is reached.

The clustering process takes into account nominal classes of downtime events, e.g., 0-2 minutes in duration for non-events, 2-15 minutes for small events, 15-45 minutes for medium events, and longer than 45 minutes for large or serious events. Ellipses 702, 704, 706, and 708 surround groups of data points in FIG. 7, chosen to best fit the data and respect the nominal class boundaries. As shown in FIG. 7, the clustering process may ensure a good distribution of samples for the four event classes when agglomerative clustering is used.

In an agglomerative clustering approach, the number of input classes may typically be defined a priori for the algorithm. In some circumstances, depending on the statistical distribution of the data, selection of the number of classes at the outset may result in a highly uneven number of samples for the defined classes. This may be avoided by use of a dynamic cluster estimation process utilizing a dynamic cluster estimation algorithm.

Figure 8:
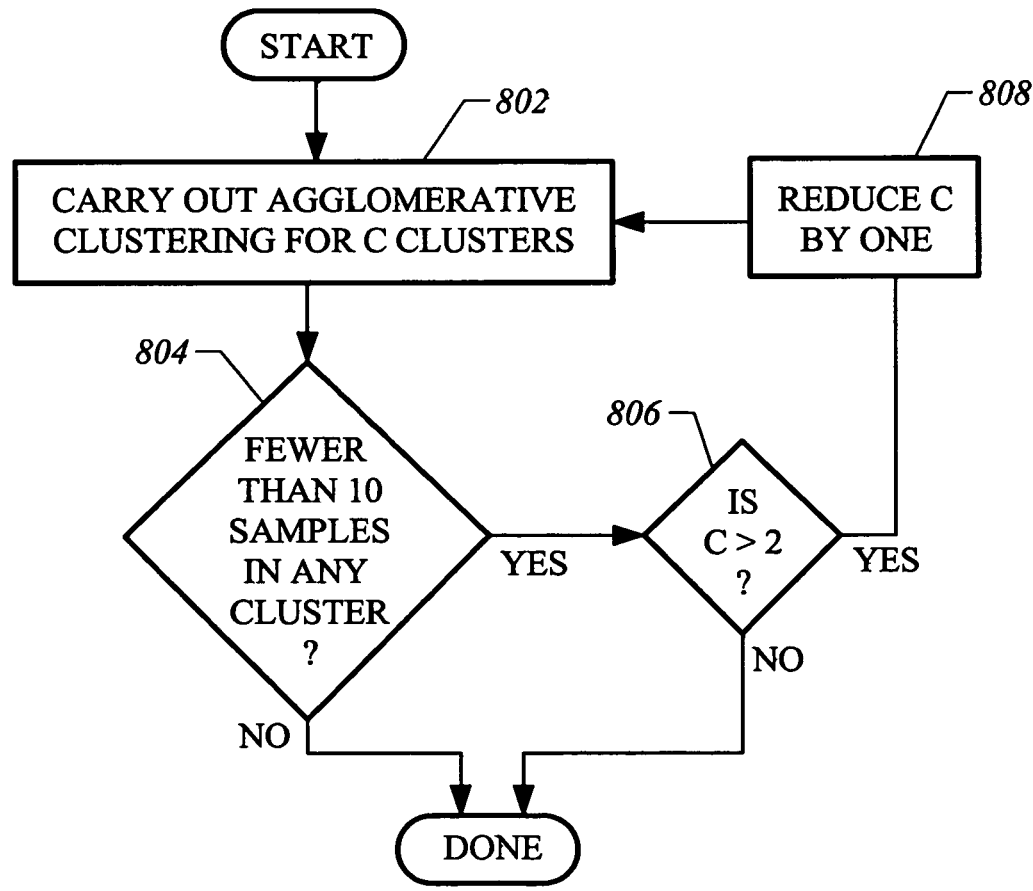
FIG. 8 shows a flowchart for dynamic class allocation.

FIG. 8 shows a flowchart for a dynamic cluster estimation algorithm 118. The algorithm may automatically select the number of classes or clusters based on, for example, criteria that a class must have at least a minimum number of samples. This approach begins with a pre-defined number of classes and applies an agglomerative clustering technique to the data 802. The number of samples is measured for each class. If the number of samples for any event class is less than the prescribed minimum number 804 (in an example this may be set to 10, or to at least 5% of the samples, or some other criterion may be used), and enough clusters remain 806, then the number of classes is reduced by one 808 and the agglomerative clustering is applied again 802 to identify the samples—i.e., the new class boundaries—for the new number of classes.

Although not shown in FIG. 1, an alternative approach to classifying the data, other than agglomerative clustering, may be used. First, a priori class definitions may be considered based on the overall observation of the time series data of different event codes and from histograms of frequency of fault occurrence, downtime duration, and MTTR. These class definitions may be, e.g., High (H), Medium High (MH), Medium Low (ML), and Low (L), corresponding to large values of frequency, duration, or MTTR, for H, to small values of frequency, duration, or MTTR, for L. The terms High, Medium High, Medium Low, and Low refer to the impact faults of the class may have on production. Faults in the Low class may sometimes be considered non-events, faults in the Medium Low class may sometimes be considered minor events, and faults in the Medium High and High classes may sometimes be considered major events. Prediction of non-events with high accuracy has much less importance for functionality of a manufacturing cell, in comparison to prediction of major events with good accuracy.

To each histogram of time-series data four Gaussian densities may be fit by placing the Gaussian density functions at the local maxima. The range of values (of frequency of occurrence, downtime duration, or MTTR) that corresponds to each Gaussian may be considered as the range for each class, hence defining the class boundaries.

The agglomerative clustering process, dynamic cluster estimation algorithm, and alternatives such as the one described above provide for developing a plurality of classes from the selected data series and input parameters. The input parameters may include, for example, a priori class definitions. Alternatively, as discussed above, a priori class definitions may be derived from initial observations of the data, from histograms of the data or from expert knowledge.

Figure 9:
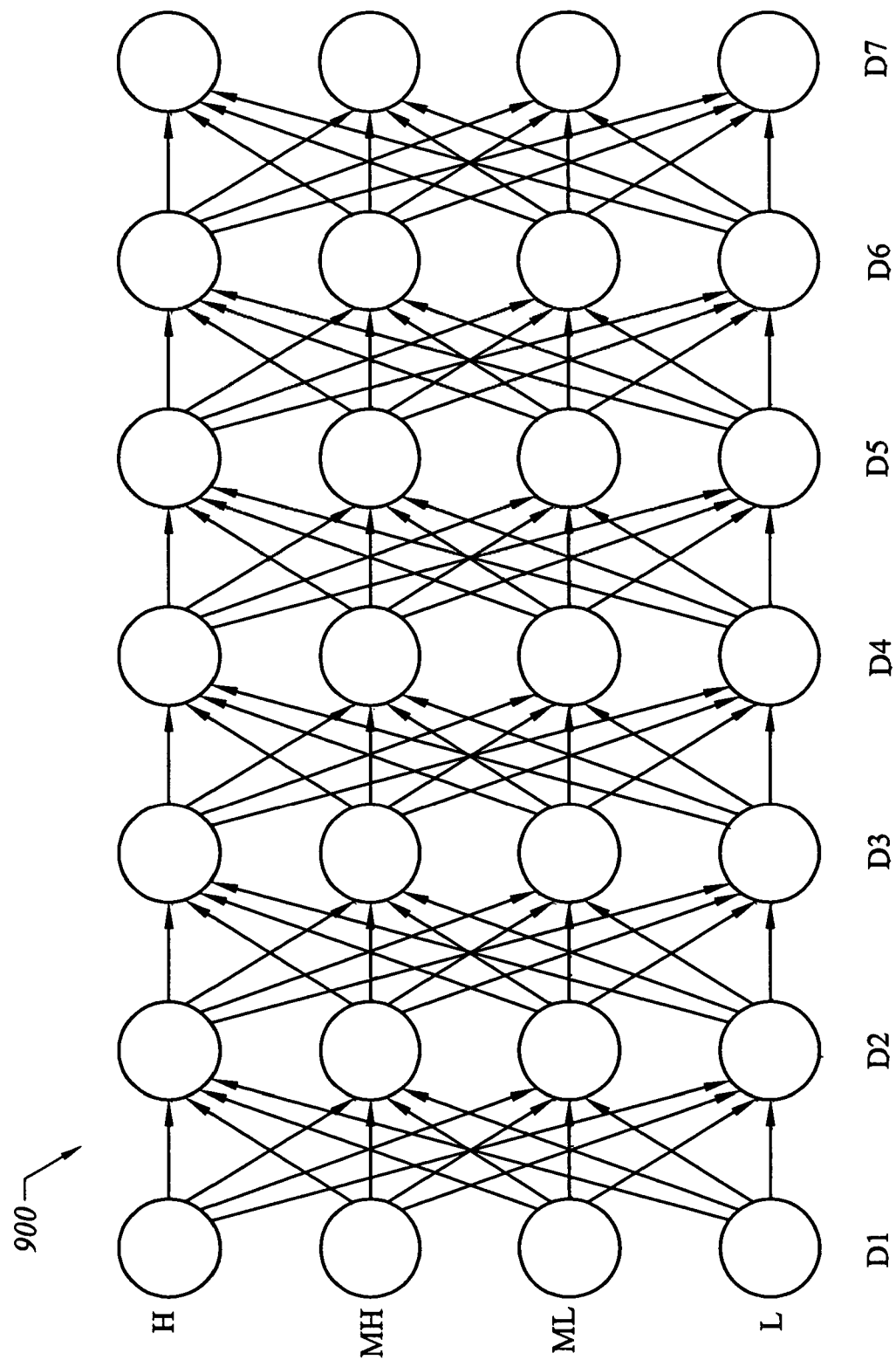
FIG. 9 shows a state diagram for a first order finite state Markov model as may be used in the embodiment of FIG. 1.

FIG. 9 shows a state diagram for a Markov model 900 as may be used in the embodiment of FIG. 1. The Markov model of FIG. 9 is a fully connected first order finite state Markov model. As discussed above, a time interval of seven days may be chosen. With a time step of 24 hours (1 day), there will be a set of states for each of the seven days. That is to say, the data is time partitioned with a time partitioning of seven days, and a time partition has an associated set of classes. For a particular time partition, with an associated class of the time partition there is a corresponding state of the Markov model. The discussion below may illustrate how the Markov model is trained, tested, and deployed in this embodiment.

The trend or behavior of an event code frequency or duration over the chosen time interval is to be predicted by the Markov model. For this, four states are considered for each time step (i.e., day), that correspond to the four classes H, MH, ML, and L for each time step. In another embodiment, with more or fewer classes, the Markov model will correspondingly have more or fewer states for each time step. The number of states may be different across days. In the discussion below, the term day is used for illustration, but any suitable time step may be used.

In still another embodiment, an agglomerative clustering algorithm may be applied separately to data at each time. The result of the agglomerative clustering process may thus be distinct sets of classes produced from the data on a time step by time step (e.g., day-by-day) basis. Classes on different days may have different values for the class boundaries, but more importantly for the Markov model, the number of classes as determined by the agglomerative clustering algorithm may differ from one day to another. Therefore, the Markov model may have differing numbers of states on different days, because the states of the Markov model are to correspond to the classes used in classifying the data.

In each of these embodiments, characteristics of the data series may determine the number of classes to be used, and hence the number of states, and this may even be on a time step by time step basis. In this way, the data drives the architecture of the Markov model. Thus, the architecture may be developed from the data series and the input parameters.

In FIG. 9, $D_t$, t=1, 2, ..., 7, corresponds to day 1 to 7 and each node, i.e., circle, corresponds to a state. Transition from each state on a given day to any other state on the following day is possible due to the model being fully connected. The model is first order since the transition is from left to right and one step, that is, a transition from $D_t$ to $D_{t'}$ where t'>t+1 is not allowed. In other words, the next time step depends on the current state and not on any state prior to the current state. In the discussion below, $D_1$ is taken to be Sunday, $D_2$ is taken to be Monday, and so on up to $D_7$, which is taken to be Saturday.

The Markov model is trained for a selected event code by first computing the state probabilities and the transition probabilities from the selected data series. The state probabilities are calculated for a selected event code data series by evaluating probabilities in the training window data using a counting method.

For example, for $D_1$, all Sunday data in the selected event code data series, during the training window, may be examined. For each Sunday it may be determined whether occurrence frequency on that day falls into class H, class MH, class ML, or class L. Similarly, it may be determined whether downtime duration on that day falls into class H, class MH, class ML, or class L. The same may be done for MTTR.

In the same way, for $D_2$, all Monday data in the selected event code data series, during the training window, may be examined. For each Monday it may be determined whether occurrence frequency, duration, and MTTR on that day falls into class H, class MH, class ML, or class L. This process continues through $D_7$, for Saturday.

The probability, for $D_1$, of the state of the Markov model corresponding to class H is determined by counting how many Sundays in the training window have, e.g., an occurrence frequency in class H, and dividing that number by the total number of Sundays in the training window. The same calculation may be carried out for the other classes MH, ML, and L. In this way the state probabilities for $D_1$, $\pi_i(1)$, i=1, 2, 3, and 4, corresponding to classes H, MH, ML, and L, respectively, are calculated. It will be appreciated that the state probabilities as determined in this manner are nonnegative, $\pi_i(1) \geq 0$, and that their sum over all states is 1.

Next, conditional probabilities are calculated to get transition probabilities of the Markov model. For example, for the transition probability from state 1 on $D_1$ to state 3 on $D_2$, the appropriate conditional probability is P(Monday has occurrence frequency in class ML|Sunday has occurrence frequency in class H). This may be calculated by counting the number of Sundays in the training window which have an occurrence frequency in class H and for which the immediately following Monday has an occurrence frequency in class ML. This number, when divided by the number of Sundays in the training window which have an occurrence frequency in class H, is the conditional probability above, and is the probability of a transition from state 1 on $D_1$ to state 3 on $D_2$. This process is then continued to get transition probabilities for all the transitions shown in FIG. 9.

These transition probabilities may be represented by $a_{ij}(t)$ for i,j=1, 2, 3, and 4, for every time step (day) $D_t$, t=1, 2, ..., 7. These transition probabilities represent the probability of a transition from state i on $D_t$ to state j on $D_{t+1}$, for t=1, ..., 6. For t=7, these transition probabilities represent the probability of a transition from state i on $D_7$ to state j on $D_1$ (arrows representing these transitions from states on $D_7$ to states on $D_1$ are omitted from FIG. 9 for clarity). The transition probabilities so determined have the properties that (1) the summation of $a_{ij}(t)$ over all states j is 1, $$\sum_j a_{ij}(t) = 1,$$

and (2) the product of the state probability for a state i with transition probability from state i into a state j, when summed over states i, gives the state probability for j, i.e., $$\sum_i \pi_i(t)a_{ij}(t) = \pi_j(t+1).$$

Although occurrence frequency was discussed above in reference to the calculation of probabilities, it will be appreciated that downtime duration and MTTR may be used. In addition, it is within the scope of this disclosure that other features of the data series may provide for calculation of probabilities.

For training of a Markov model $\lambda = [\pi_i(t), a_{ij}(t)]$, the past time-series data is used and initial values for the probabilities are computed using the counting method as described above. Since the number of days with Low or Medium Low downtime durations or MTTRs may be large compared to High or Medium High, states corresponding to major events would have lower probabilities calculated by the counting method as compared to states corresponding to non-events. In this sense, the counting method would provide biased probabilities, i.e., the probability values would be more biased toward Low and Medium Low states. Similar bias will be there for transition probabilities as well. This bias may result in prediction that is skewed toward the prediction of non-events. To address this, the state and transition probabilities are adjusted to improve prediction of major events, as described below.

Given the Markov model $\lambda = [\pi_i(t), a_{ij}(t)]$, the likelihood for a path beginning on $D_1$ in state $i_1$ and continuing through states $i_2, \ldots, i_6$ to end in state $i_7$ on $D_7$, is given by the product $\pi_{i1} \cdot a_{i1,i2} \cdot a_{i2,i3} \cdot a_{i3,i4} \cdot a_{i5,i6} \cdot a_{i6,i7}$. A similar calculation provides the likelihood for a path beginning on $D_2$ in state $i_2$ and continuing through states $i_3, \ldots, i_7$ to end in state $i_1$ on $D_1$: $\pi_{i2} \cdot a_{i2,i3} \cdot a_{i3,i4} \cdot a_{i4,i5} \cdot a_{i5,i6} \cdot a_{i6,i7} \cdot a_{i7,i1}$. The likelihoods for paths beginning on other days may be similarly calculated. In this embodiment there are $4^7$ paths of length 7 beginning on a given day, for $7 \times 4^7$ paths of length 7 in all. It will be appreciated that in an embodiment in which there are s states, and in which a data series is mapped to k time steps, there are $s^k$ paths of length k beginning at a given time step, for $k \times s^k$ paths in all.

A method for use in predicting the trend in this model includes choosing a start day and finding the state sequence $q = (q_1, q_2, \ldots, q_7)$ of states that are individually most likely at each time step $D_r$. For this, the following Viterbi algorithm is applied. First the quantity $\delta_t(i)$ is defined:

$$\delta_t(i) = \max_{q_1, q_2, \ldots, q_{t-1}} P[q_1, q_2, \ldots q_{t-1}, q_t = i | \lambda]$$

where $q_1$ corresponds to the individually most likely state at a first time step, $q_2$ corresponds to the individually most likely state at the immediately following time step, and so on up to the time step t. This quantity corresponds to the best score (highest probability) along a single path at time t which accounts for the first t trend prediction and ends in state i. It follows by induction that $\delta_{t+1}(j) = \max [\delta_t(i) a_{ij}(t)]$. The state sequence may be retrieved by keeping track of the arguments that maximized this equation for each i, j, which may be done through use of an array $\psi_t(j)$. The complete procedure to find the best state sequence (i.e., the highest likelihood path) according to this Viterbi algorithm is as follows:

1. Initialization:

$$\delta_1(i) = \pi_i, \ 1 \leq i \leq 4$$

$$\psi_1(i) = 0, \ 1 \leq i \leq 4$$

2. Recursion:

$$\delta_t(j) = \max_{1 \leq i \leq 4} [\delta_{t-1}(i) a_{ij}(t)], \ 2 \leq t \leq 7, \ 1 \leq j \leq 4$$

$$\psi_t(j) = \arg\max_{1 \leq i \leq 4} [\delta_{t-1}(i) a_{ij}(t)], \ 2 \leq t \leq 7, \ 1 \leq j \leq 4$$

3. Termination:

$$p^* = \max_{1 \leq i \leq 4} [\delta_7(i)]$$

$$q_7^* = \arg\max_{1 \leq i \leq 4} [\delta_7(i)]$$

4. Path (state sequence) backtracking:

$$q_t^* = \psi_{t+1}(q_{t+1}^*), \ t = T-1, T-2, \ldots, 1 \text{ where } T=7.$$

The optimal state and transition probabilities of a Markov model can predict the occurrences of major events more accurately than non-optimal state and transition probabilities. To find these optimal probabilities while training, the likelihoods of paths are calculated as described above using the initial state and transition probabilities for a given fault. The predicted paths are then compared with real paths that were found using the training data, as follows.

After their generation and evaluation of their likelihood, the predicted paths are sorted according to their likelihood. While comparing with the real paths, the top N predicted paths may be chosen from the sorted list. N may range up to $4^7$ for the embodiment discussed herein, but in any embodiment is preferably a fraction, for example, the top 10 most likely out of the total number of paths possible.

If the prediction is accurate, the top path, having rank 0 in the sorted list would match with the real path. Thus, a good measure of the state and transition probabilities lies in the comparison of a real path with the predicted paths through the rank of the real path in the sorted list of predicted paths. That rank is the rank of the predicted path that matches with the real path. For example, if the real path matches with the $3^{rd}$ predicted path out of the list of N predicted paths, then the rank of the real path is 3. Hence state and transition probabilities for a Markov model for each fault type may be optimized by choosing them so as to minimize a metric D, defined as the sum, over a set of performance paths chosen from the data series, of the ranks of those performance paths in the sorted list of predicted paths determined by the state and transition probabilities, $$D = \sum_{p \in PP} r_p$$

Alternatively, another metric may be supplied for determining goodness of the Markov model. In this way, state and transition probabilities may be adjusted so that substantially optimal performance of the Markov model according to the metric may be obtained.

In the summation above for D, PP is the set of performance paths chosen from the data series. The set of performance paths may be the set of all real paths in the data series which contain at least one major event. $r_p$ is the rank of the performance path p in the sorted list of predicted paths. Thus, if all the performance paths appear at the top of the corresponding sorted list of predicted paths, then the rank of each performance path is zero which implies D equals zero. In order to find optimal, or near optimal, state and transition probabilities for each fault type, a collection of several sets of such probabilities are tried, and the set giving the smallest value for D selected.

One way to choose a small collection of sets of trial probabilities may be to use a hill climbing method, starting from the initially determined state and transition probabilities. Another method may be to use a grid method, selecting points at vertices of a grid in the space of state and transition probabilities, to try. Each of these two methods has advantages and disadvantages. In the embodiment as described herein, a method which combines a hill climbing method with a grid method is used. In a different embodiment another search algorithm may be used. Once the Markov model is trained, the selected Markov model parameters, i.e., the number of states, their probabilities, and the transition probabilities, may be produced as output.

A finite state Markov model, as described above, may be trained for each chosen event code that has more than, for example, 14 sample data points, using sorted fault report data of 12 months. For this sorting, three criteria may be applied—frequency of occurrence, MTTR, and total downtime. As discussed above, the training of Markov models corresponds to computing each state probability and transition probability, i.e., $\lambda=[\pi_i(t), a_{ij}(t)]$ for all I and j. For this computation, a 12 month fault report data set for a chosen fault may be stacked along a 7 day period by aligning initially fault reports from Sunday to Saturday. Thus D1 in FIG. 9 corresponds to "Day 1" (Sunday) and D7 corresponds to Saturday. Both state and transition probabilities may be computed by the counting method as discussed above, and subsequently adjusted for better prediction of major events.

The trained models may be tested by predicting the frequency of occurrence, downtime, and average downtime (i.e., mean time to repair or MTTR) for the faults that were sorted by applying the criteria. For the total prediction period, the consecutive 12 months to the ones used for training the model may be chosen. The prediction may, however, be performed week by week using the prediction horizon of two days. While predicting, the starting state on Day 1 may be selected based on the end state of the previous week. For this, if actual data is available it may be used, otherwise the predicted end state of the previous week may be used. After determining the starting state, the likelihoods for paths transitioning from the initial state on Day 1 on through to Day 7 may be determined as previously described. The Viterbi algorithm may be applied as well. The paths with highest likelihood may be rank ordered by likelihood and the top 5 considered.

Two approaches may be used in validating the accuracy of prediction using actual fault report data over the 12 month testing period. In a first approach, the predicted path—i.e., the path with the highest likelihood—may be compared with the actual data. An exact match, state-by-state, for the entire week may be denoted an "exact match." In a second approach, the predicted path may be compared with the actual data, and if the predicted path differs from the actual data by one state (i.e., if the real state is H and the predicted state is MH) on any one of the seven days, may be denoted an "approximate match." In another aspect of the validating and evaluation of the Markov models, the second most likely path may be considered in addition to the most likely path.

Results of the evaluation may include statistics for path prediction accuracy, in percent; the total number of occurrences for which an "exact match" may be found; the total number of occurrences for which an "approximate match" may be found; and the occurrence prediction percentage, i.e., in percent, the number of event codes matched divided by the total number of event codes modeled, for both exact matches and approximate matches. These statistics may be compiled for downtime durations and MTTR values as well as for occurrences.

As previously discussed, a Markov model architecture may be developed based on the data series and input parameters. Then, a Markov model having the architecture may be disposed. Disposing a Markov model for trend prediction comprises steps of initializing the Markov model with state and transition probabilities as determined from the data, training the Markov model as described in detail above, and deploying the Markov model.

After disposing the Markov model for trend prediction, new data may be acquired. As new data is acquired, the number of class and/or the class boundaries may change upon re-application of the agglomerative clustering process (or another process for class determination), Moreover, state probabilities and transition probabilities may be re-calculated to keep the Markov model up-to-date. Updating the Markov model as new data is acquired may entail updating training of the Markov model by generating anew a sorted list of predicted paths, re-selecting a set of performance paths, re-applying the metric, and adjusting the state and transition probabilities to have substantially optimal values according to the metric. It may also be desirable to re-exercise and re-evaluate the trained Markov model following its updating.

Figure 10:
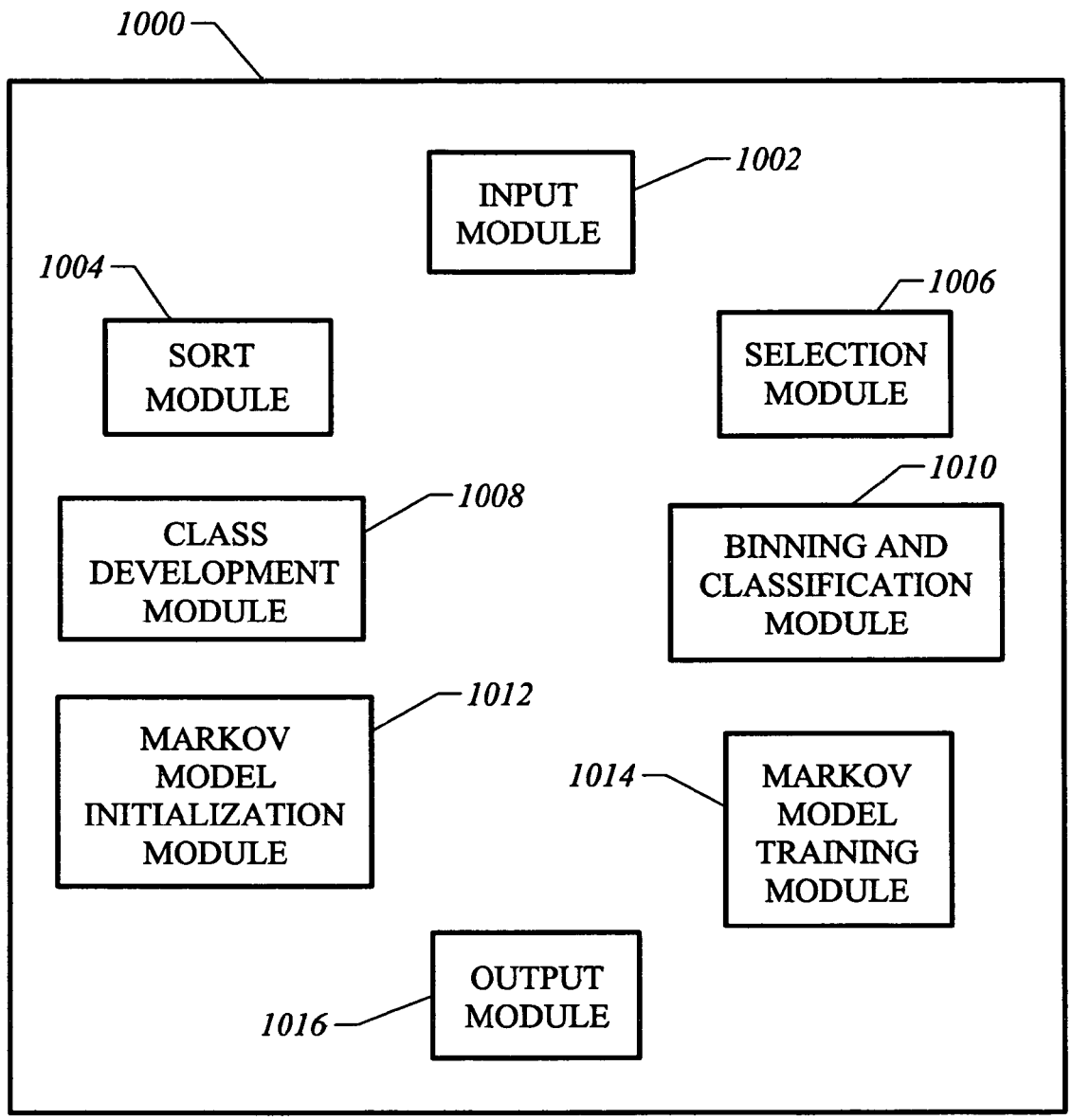
FIG. 10 shows an embodiment of a system for trend prediction with a Markov model.

FIG. 10 shows an embodiment of a system 1000 for trend prediction with a Markov model. System 1000 includes an input module 1002 for receiving a plurality of data series and input parameters. In addition, new data may continually be acquired by the system. The system also includes a sort module 1004 for sorting the plurality of data series to form a sorted plurality of data series. At 1006, the system includes a selection module for selecting data series from the sorted plurality of data series to form selected data series.

A class development module for developing a plurality of classes from the selected data series and input parameters is included at 1008. A binning and classification module 1010 for binning and classifying the selected data series according to an input parameter and the plurality of classes is also included.

The system further includes a Markov model initialization module 1012 for initializing the Markov model for trend prediction, and a Markov model training module 1014 for training the Markov model for trend prediction of the binned and classified data series to form a trained Markov model.

Finally, system 1000 includes an output module 1016 for outputting trend predictions of the trained Markov model.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for identifying trends of fault occurrences in a manufacturing process, the system including computer-readable medium tangibly embodying computer-executable instructions for:
receiving a plurality of data series and input parameters, the input parameters comprising a time step parameter, said data series including discrete data elements that identify the fault occurrences in the manufacturing process;
preprocessing the plurality of data series according to the input parameters, to form binned and classified data series, where the discrete data elements in each of the data series are classified into a particular bin depending on when they occurred per the time parameter, wherein preprocessing the plurality of data series includes clustering the classified data series to iteratively arrange the data elements into clusters to provide a predetermined criteria, and wherein preprocessing the plurality of data series includes classifying the data elements that identify the fault occurrences according to frequency of occurrence, mean time to repair and/or duration of downtime and selecting the most frequently occurring fault occurrences and/or the fault occurrences resulting in the longest downtime duration;
processing the binned and classified data series, the processing comprising:
initializing a model for trend prediction including determining the number of known states in the model based on the data series and associating a state of the model for each class of data determined by the binned and classified data series;
training the model for trend prediction of the binned and classified data series to form a trained model, said model being trained to predict trends of the data series by determining the probability of states of the data as classified and binned and the probability of transition of the data from state to state where the state probabilities are calculated for the data series by evaluating a probability in a training window, wherein training the model includes training the model to predict the frequency of occurrence, the mean time to repair and/or the downtime duration of the fault occurrences, using the model to predict frequency and/or duration of the fault occurrences during a testing period that immediately succeeds a training period of the model to identify trend predictions of the fault occurrences, and evaluating the accuracy of the trend predictions by comparing the trend predictions during the testing period with actual data obtained during the testing period; and
deploying the trained model for trend prediction in the manufacturing process, the deploying comprising:
outputting trend predictions that identify predictions of fault occurrences that may occur during the manufacturing process; and
updating training of the model when new data is obtained during the manufacturing process.

2. The method of claim 1, wherein preprocessing further comprises:
selecting a data series from sorted plurality of data series to form selected data series.

3. The method of claim 2, wherein preprocessing further comprises:
developing a plurality of classes from the selected data series and input parameters.

4. The method of claim 3, wherein preprocessing comprises:
binning and classifying the selected data series according to the time step parameter and the plurality of classes.

5. The method of claim 3, wherein developing a plurality of classes comprises:
adopting a priori class definitions;
initially classifying data of the data series according to the a priori class definitions, to form classified data; and
applying an agglomerative clustering process to the classified data, to obtain the plurality of classes.

6. The method of claim 1, wherein training the model for trend prediction comprises:
supplying a metric for determining goodness of the model;
applying the metric to the model; and
adjusting the state probabilities and transition probabilities of the model to obtain substantially optimal performance of the model according to the metric.

7. The method of claim 6, wherein supplying a metric for determining goodness of the model comprises:
from the data series, choosing a set of performance paths;
generating predicted paths with the model;
sorting the predicted paths according to likelihood, to obtain a sorted set of predicted paths; and
summing the ranks of the performance paths in the sorted list of predicted paths, to obtain the total predicted performance path rank for the model;
wherein the metric for determining the goodness of the model is the value of the total predicted performance path rank.

8. The method according to claim 1 wherein the model is a Markov model.

9. A system for identifying trends of fault occurrences in a manufacturing process with a Markov model, the system comprising:
a plurality of modules wherein each module includes non-transitory computer-readable medium with an executable program stored thereon, the plurality of modules including:
an input module configured to receive a plurality of data series and input parameters;
a sort module configured to sort the plurality of data series to form a sorted plurality of data series, said data series including discrete data elements that identify the fault occurrences in the manufacturing process;
a selection module configured to select data series from the sorted plurality of data series to form selected data series;
a class development module configured to develop a plurality of classes from the selected data series and input parameters; and
a binning and classification module configured to bin and classify the selected data series according to an input parameter and the plurality of classes, where the discrete data elements in each of the data series are classified into a particular bin depending on when they occurred, wherein the binning and classification module clusters the classified data series to iteratively arrange the data elements into clusters to meet a predetermined criteria, and wherein classifying the selected data series includes identifying the fault occurrences according to frequency of occurrence, mean time to repair and/or duration of downtime and selecting the most frequently occurring fault occurrences and/or the fault occurrences resulting in the longest downtime duration;

a Markov model initialization module configured to initialize the Markov model for trend prediction including determining the number of known states in the Markov model based on the data series and associating a state of the Markov model for each class of data determined by the binned and classified data series;

a Markov model training module configured to train the Markov model for trend prediction of the binned and classified data series to form a trained Markov model, said Markov model being trained to predict trends of the data series by determining the probability of states of the data as classified and binned and the probability of the transition of data from state to state where the state probabilities are calculated for the data series by evaluating a probability in a training window, wherein training the Markov model includes training the model to predict the frequency of occurrence, the mean time to repair and/or the downtime duration of the fault occurrences, using the model to predict frequency and/or duration of the fault occurrences during a testing period immediately succeeding a training period of the model, and evaluating the accuracy of the trend predictions by comparing the trend predictions during the testing period with actual data obtained during the testing period;

an output module configured to output trend predictions upon deployment of the trained Markov model that identify predictions of fault occurrences that may occur during the manufacturing process; and updating the training of the model when new data is obtained during the manufacturing process.

10. The system of claim 9, wherein the sorting module is configured to sort the plurality of data series according to at least one signal characteristic.

11. The system of claim 9, wherein a state of the Markov model corresponds to a class of the plurality of classes.

12. The system of claim 9, wherein:
the training module applies a metric to the Markov model for determining goodness of the Markov model; and
training the Markov model for trend prediction comprises adjusting the state probabilities and transition probabilities to obtain substantially optimal performance of the Markov model according to the metric.

13. The system of claim 12, wherein adjusting the state probabilities and transition probabilities comprises:
choosing a plurality of state probabilities and transition probabilities according to a search algorithm;
evaluating a value of the metric for each of the plurality of state probabilities and transition probabilities; and
selecting state probabilities and transition probabilities from the plurality of state probabilities and transition probabilities that provide an optimal value of the metric, among the evaluated values.

14. A system for identifying trends of fault occurrences in a manufacturing process, the system including computer-readable medium tangibly embodying computer-executable instructions for:
receiving a data series and input parameters, said data series including discrete data elements that identify the fault occurrences in the manufacturing process;

classifying the discrete data elements in each of the data series into a predetermined bin depending on when they occurred, wherein classifying the discrete data elements of data series includes clustering the classified data series to iteratively arrange the data elements into clusters to meet a predetermined criteria, and wherein classifying the discrete data elements includes classifying the fault occurrences according to frequency of occurrence, mean time to repair and/or duration of downtime and selecting the most frequently occurring fault occurrences and/or the fault occurrences resulting in the longest downtime duration;

developing an architecture for a Markov model from the data series and the input parameters including determining the number of known states in the Markov model based on the data series and associating a state of the Markov model for each class of data determined by the binned and classified data series, wherein developing an architecture for a Markov model includes training the model to predict the frequency of occurrence, the mean time to repair and/or the downtime duration of the fault occurrences, using the model to predict frequency and/or duration of the fault occurrences during a testing period immediately succeeding a training period of the model, and evaluating the accuracy of the trend predictions by comparing the trend predictions during the testing period with actual data obtained during the testing period;

disposing a Markov model having the architecture for trend prediction, said Markov model being trained to predict trends of the data series by determining the probability of states of the data as classified and binned and the probability of the transition of data from state to state where the state probabilities are calculated for the data series by evaluating a probability in a training window that identify predictions of fault occurrences that may occur during the manufacturing process; and updating the training of the model when new data is obtained during the manufacturing process.

15. The method of claim 14, wherein the input parameters comprise a time step parameter, and wherein developing an architecture for a Markov model from the data series and the time step parameter comprises:
partitioning the data series according to the time step parameter to form time partitioned data;
developing a plurality of classes from the time partitioned data and the input parameters; and
associating a state of the Markov model with a class of the plurality of classes.

16. The method of claim 15, wherein developing a plurality of classes comprises:
adopting a priori class definitions;
initially classifying the time partitioned data according to the a priori class definitions, to form classified data; and
applying an agglomerative clustering process to the classified data, to obtain the plurality of classes.

17. The method of claim 15, wherein the time partitioned data comprise binned data, the method further comprising:
classifying the time partitioned data according to the plurality of classes, to form binned and classified data.

18. The method of claim 17, wherein disposing a Markov model having the architecture, for trend prediction, comprises:
initializing the Markov model, comprising:
determining initial state probabilities by applying a counting method to the binned and classified data; and determining initial transition probabilities by applying a counting method to the binned and classified data;

training the Markov model; and deploying the Markov model.

19. The method of claim 18, wherein training the Markov model for trend prediction comprises:

supplying a metric for determining goodness of the Markov model;

applying the metric to the Markov model; and adjusting the state probabilities and transition probabilities of the Markov model to obtain substantially optimal performance of the Markov model according to the metric.

20. The method of claim 19, wherein supplying a metric for determining goodness of the Markov model comprises:

from the binned and classified data, choosing a set of performance paths;

generating predicted paths with the Markov model;

sorting the predicted paths according to likelihood, to obtain a sorted set of predicted paths; and summing the ranks of the performance paths in the sorted list of predicted paths, to obtain the total predicted performance path rank for the Markov model;

wherein the metric for determining the goodness of the Markov model is the value of the total predicted performance path rank.

* * * * *